US010620795B2

(12) United States Patent
Wallis et al.

(10) Patent No.: US 10,620,795 B2
(45) Date of Patent: Apr. 14, 2020

(54) COMPUTER PROGRAM PRODUCTS AND METHODS FOR DISPLAYING DIGITAL LOOSELEAF CONTENT

(71) Applicant: LexisNexis, a division of Reed Elsevier Inc., Miamisburg, OH (US)

(72) Inventors: Peter Daniel Wallis, New South Wales (AU); Alyson Lee Piper, New South Wales (AU); Matthew David Lawrence, New South Wales (AU); Trisnadi Kurniawan, New South Wales (AU)

(73) Assignee: RELX INC., New York, NY (US)

( * ) Notice: Subject to any disclaimer, the term of this patent is extended or adjusted under 35 U.S.C. 154(b) by 1533 days.

(21) Appl. No.: 13/851,999

(22) Filed: Mar. 28, 2013

(65) Prior Publication Data

US 2014/0281936 A1    Sep. 18, 2014

Related U.S. Application Data

(63) Continuation of application No. PCT/US2013/031269, filed on Mar. 14, 2013.

(51) Int. Cl.
*G06F 3/0483* (2013.01)
*G06F 17/24* (2006.01)

(52) U.S. Cl.
CPC .......... *G06F 3/0483* (2013.01); *G06F 17/241* (2013.01)

(58) Field of Classification Search
CPC .............................. G06F 17/211; G06F 3/0483
See application file for complete search history.

(56) References Cited

U.S. PATENT DOCUMENTS 7,103,836 B1 * 9/2006 Nakamura ........ G06F 17/30905
                                                              707/E17.121
7,363,593 B1    4/2008 Loyens et al.
(Continued)

FOREIGN PATENT DOCUMENTS

CN       101681350 A      3/2010
WO       2009087999       7/2009

OTHER PUBLICATIONS

First Examination Report from New Zealand Intellectual Property Office, dated Oct. 13, 2015 in New Zealand Patent Application No. 700926.

(Continued)

*Primary Examiner* — Scott T Baderman
*Assistant Examiner* — Steve P Golden
(74) *Attorney, Agent, or Firm* — Dinsmore & Shohl LLP

(57) ABSTRACT

Computer program products and methods for displaying information relating to one or more digital looseleafs are disclosed. In one embodiment, a computer program product includes a computer usable medium having computer readable instructions embodied therein. The computer readable instructions cause a processor to display of a first table of contents page of a digital looseleaf. In response to receipt of a user selection of a representation of an individual one of the plurality of main sections, a second table of contents page is displayed overtop the first table of contents page such that an edge portion of the first table of contents page is unobstructed by the second table of contents page. In response to receipt of a user input in the edge portion of the first table of contents page, an entirety of the first table of contents page is displayed.

20 Claims, 13 Drawing Sheets

(56) References Cited

U.S. PATENT DOCUMENTS

| | | | |
|---|---|---|---|
| 7,421,652 | B2 | 9/2008 | Yuan et al. |
| 7,496,829 | B2 | 2/2009 | Rubin et al. |
| 7,725,836 | B2 | 5/2010 | Moehrle |
| 7,996,436 | B2 | 8/2011 | Schneider et al. |
| 2002/0167538 | A1 | 11/2002 | Bhetanabholta |
| 2003/0076536 | A1 | 4/2003 | Daffner |
| 2004/0098363 | A1 | 5/2004 | Anglin et al. |
| 2008/0288894 | A1 | 11/2008 | Han et al. |
| 2009/0254802 | A1* | 10/2009 | Campagna ............ G06F 17/248 715/209 |
| 2010/0005381 | A1* | 1/2010 | Safars ............... G06F 17/30899 715/205 |
| 2010/0329567 | A1* | 12/2010 | Tanaka ............... G06K 9/00469 382/190 |
| 2011/0066966 | A1* | 3/2011 | Worrall ............... G06F 17/211 715/776 |
| 2011/0106767 | A1* | 5/2011 | Zane ............... G06F 17/30445 707/645 |

OTHER PUBLICATIONS

Singapore Application No. 11201406204S, Search Report and Written Opinion, dated Aug. 31, 2015.

International Search Report issued in PCT/US13/31269 dated May 28, 2013.

The State Intellectual Property Office of the People's Republic of China, First Office Action on application No. 201380027932.9, dated Jul. 1, 2016.

The State Intellectual Property Office of the People's Republic of China, Second Office Action on application No. 201380027932.9, dated Mar. 6, 2017.

European Patent Office, Supplementary European Search Report on patent No. EP13770249, dated Dec. 17, 2015.

Westlawinsider, "Thomson Reuters ProView: Tutorials", Nov. 29, 2011, p. 1, XP054976237, retrieved from the Internet: URL:https://www.youtube.com/watch?feature=player_embedded&v=9nDW4UxADZY.

Anonymous: "Law Geek Down Under: A review of ProView from Thomson Reuters—a clear winner", Feb. 8, 2012, XP055233401, retrieved from the Internet URL:http://lawgeekdownunder.blogspot.com/au/2012/02/review-of-proview-from-thomson-reuters.html.

Masatomo Kobayashi et al: "Considering the direction of cursor movement for efficient traversal of cascading menus", Proceedings of the 16th Annual ACM Symposium on User Interface Software and Technology: Vancouver, Canada, Nov. 2-5, 2003, pp. 91-94, New York, NY DOI: 10.1145/964696.964706 ISBN: 978-1-58113-636-4.

New Zealand Intellectual Property Office, Further Examination Report on application No. 700926, dated May 10, 2016.

Intellectual Property Office of Singapore, Second Written Opinion on application No. 11201406204S, dated May 4, 2016.

Australian Government IP Australia, Patent Examination Report No. 1 on application No. 2016201677, dated Oct. 21, 2016.

Australian Government IP Australia, Patent Examination Report No. 2 on application No. 2016201677, dated Oct. 26, 2016.

Examination Report from the Intellectual Property Office of Singapore issued in corresponding Singapore Application No. 11201406204S, dated May 3, 2017.

\* cited by examiner

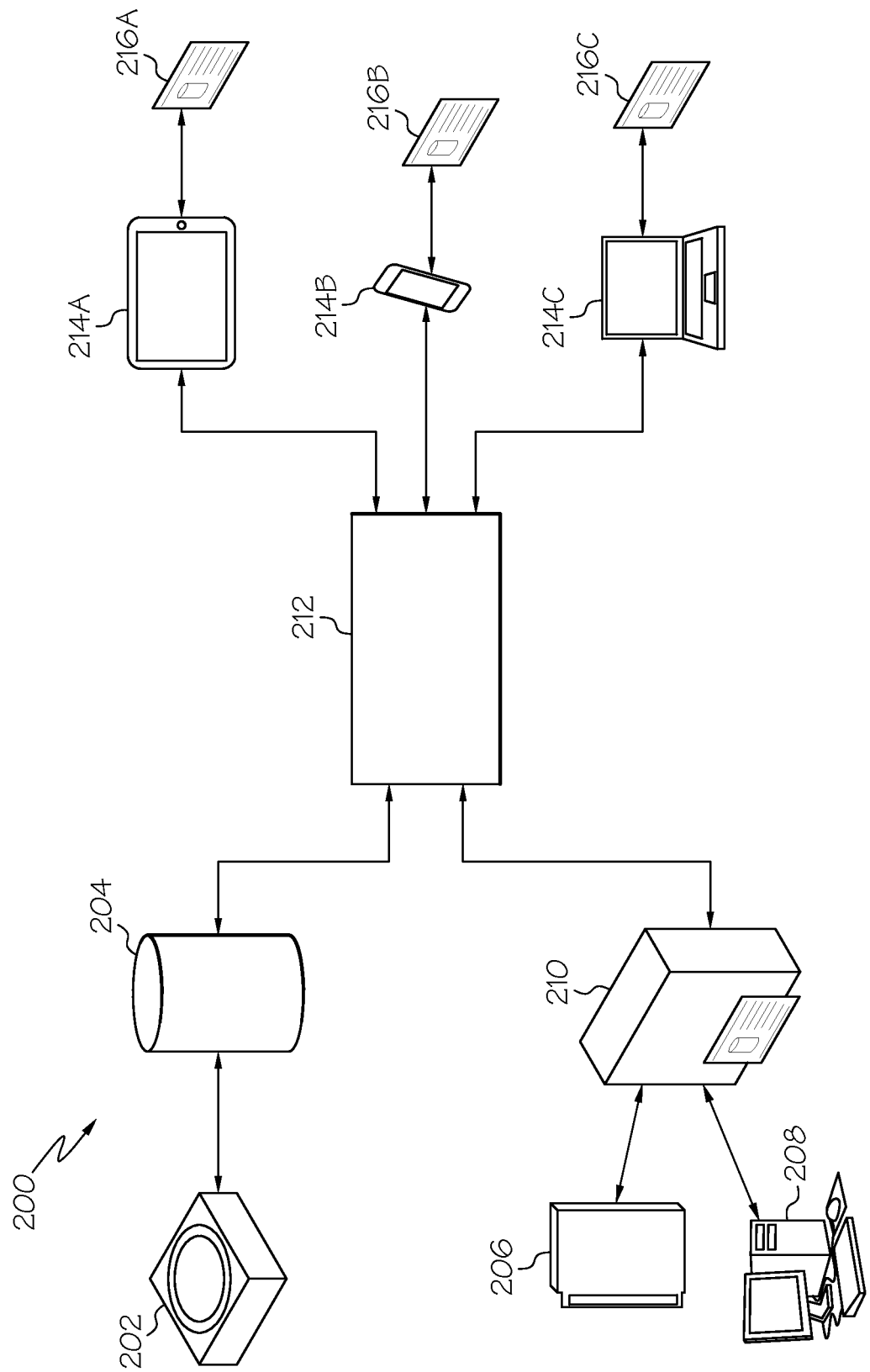

COMPUTER PROGRAM PRODUCTS AND METHODS FOR DISPLAYING DIGITAL LOOSELEAF CONTENT

CROSS-REFERENCE TO RELATED APPLICATIONS

This application is a continuation of PCT/US2013/31269 entitled "COMPUTER PROGRAM PRODUCTS AND METHODS FOR DISPLAYING DIGITAL LOOSELEAF CONTENT," filed on Mar. 14, 2013, which claims the benefit of U.S. Provisional Patent Application Ser. No. 61/617,608 entitled "SYSTEMS, METHODS AND DEVICES FOR DIGITAL LOOSELEAF CREATION, DELIVERY AND DISPLAY," filed on Mar. 29, 2012, the entire disclosures of which are incorporated by reference herein.

BACKGROUND

Field

The present specification generally relates to looseleaf publications and, more particularly, to computer program products and methods for displaying digital looseleaf content on mobile computing devices.

Technical Background

Professionals, such as legal professionals, must often transport a large number of documents, such as looseleaf documents. Looseleaf documents or services ("looseleaf") combine information pertaining to a particular topic, such as a legal topic, from various sources (e.g., court cases, laws, law reviews, and the like). Looseleafs are commonly made up of unbound pages that are maintained in a ring binder and separated into sections by topical guide cards. For example, a looseleaf document may be organized via guide cards by main sections with various levels of sub-sections depending on the topic. Looseleaf documents are frequently updated by publication of updated sections via a looseleaf service publisher. For example, a particular section of a looseleaf document may be updated when a rule of law changes, or new court decisions have an impact on legal practice. When a section of a looseleaf is updated, a professional may remove the pages of the old section within the binder and replace them with the pages of the new, updated section, for example.

However, the transport and organization of such looseleafs may be burdensome, particularly when the professional must travel to locations away from his or her home office (e.g., trials, depositions, conferences, client visits, and the like). The professional may not wish to take on the burden of traveling with a large number of looseleaf documents. However, the professional may be in need of looseleafs that he or she left at the office or home.

Accordingly, a need exists for alternative looseleaf solutions that are less burdensome on professionals and other users.

SUMMARY

In one embodiment, a computer program product includes a computer usable medium having computer readable instructions embodied therein for displaying information relating to one or more digital looseleafs. The computer readable instructions, when executed by a processor, cause the processor to effect the display of a first table of contents page of a digital looseleaf on a computer display, wherein the digital looseleaf comprises hierarchically organized content, and the first table of contents page displays a representation of a plurality of main sections associated with the hierarchically organized content. In response to receipt of a user selection of a representation of an individual one of the plurality of main sections, the computer readable instructions cause the processor to effect display of a second table of contents page overtop the first table of contents page such that an edge portion of the first table of contents page is unobstructed by the second table of contents page, wherein the second table of contents page displays a representation of a plurality of first sub-sections associated with the selected representation of the individual one of the plurality of main sections. In response to receipt of a user input in the edge portion of the first table of contents page, the computer readable instructions cause the processor to effect display of an entirety of the first table of contents page.

In another embodiment, a method in a computer system for displaying information relating to a digital looseleaf includes presenting a first table of contents page of the digital looseleaf, wherein the digital looseleaf comprises hierarchically organized content, and the first table of contents page comprises a representation of a plurality of main sections associated with the hierarchically organized content. The method further includes, in response to receipt of a user selection of a representation of an individual one of the plurality of main sections, presenting a second table of contents page overtop the first table of contents page such that an edge portion of the first table of contents page is unobstructed by the second table of contents page, wherein the second table of contents page comprises a representation of a plurality of first sub-sections associated with the selected representation of the individual one of the plurality of main sections. The method also includes, in response to receipt of a user input in the edge portion of the first table of contents page, presenting an entirety of the first table of contents page.

In yet another embodiment, a computer program product includes a computer usable medium having computer readable instructions embodied therein for displaying one or more digital looseleafs. The computer readable instructions, when executed by a processor, cause the processor to effect the display of a representation of at least one of the one or more digital looseleafs on a computer display, and the display of an update summary of one or more digital looseleafs. In response to receipt of a user selection of the one or more digital looseleafs, the computer readable instructions cause the processor to effect the display of a first table of contents page of the selected digital looseleaf, wherein the selected digital looseleaf comprises hierarchically organized content, and the first table of contents page displays a representation of a plurality of main sections associated with the hierarchically organized content. In response to a user selection of a representation of an individual one of the plurality of main sections, the computer readable instructions cause the processor to effect the display of a second table of contents page overtop the first table of contents page such that an edge portion of the first table of contents page is unobstructed by the second table of contents page, wherein the second table of contents page displays a representation of a plurality of first sub-sections associated with the selected representation of the individual one of the plurality of main sections. In response to a user input in the edge portion of the first table of contents page, the computer readable instructions cause the processor to effect the display of an entirety of the first table of contents page.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 3A depicts a schematic illustration of an exemplary digital looseleaf system according to one or more embodiments described and illustrated herein;

DETAILED DESCRIPTION

Referring generally to the figures, embodiments of the present disclosure are directed to systems, methods and computer program products for the design, development, distribution and display of digital looseleafs in a digital looseleaf service e-reader application for display of content that is capable of being used on mobile electronic devices, such as tablet devices. Embodiments enable professionals to conveniently view looseleaf content on portable, compact tablet devices (as well as smart phones, laptop computers, netbook computers, and the like) when offline or online. Embodiments may enable legal organizations to lower costs of filing, managing and storing looseleaf publications, which may be organized and stored in the legal organization's library. Embodiments may also create a solution channel to package customized sets of content (at guide card level) to generate new revenue streams. Embodiments may also allow a user to quickly and efficiently review the table of contents of digital looseleafs by use of interactive table of content pages that are displayed in an overlapping arrangement. Accordingly, embodiments may take advantage of tablet devices to improve professionals' work efficiency, productivity, and satisfaction while working away from the office.

It is noted that the term "looseleaf" is used herein to describe looseleaf publications, looseleaf titles, or looseleaf services that are documents made up of individually updated content particular to a topic (e.g., a legal topic or a medical topic). Embodiments described herein allow users to view digital rather than paper looseleafs. Each digital looseleaf comprises content pages that are organized into sections (e.g., main sections and various sub-sections).

Figure 1:
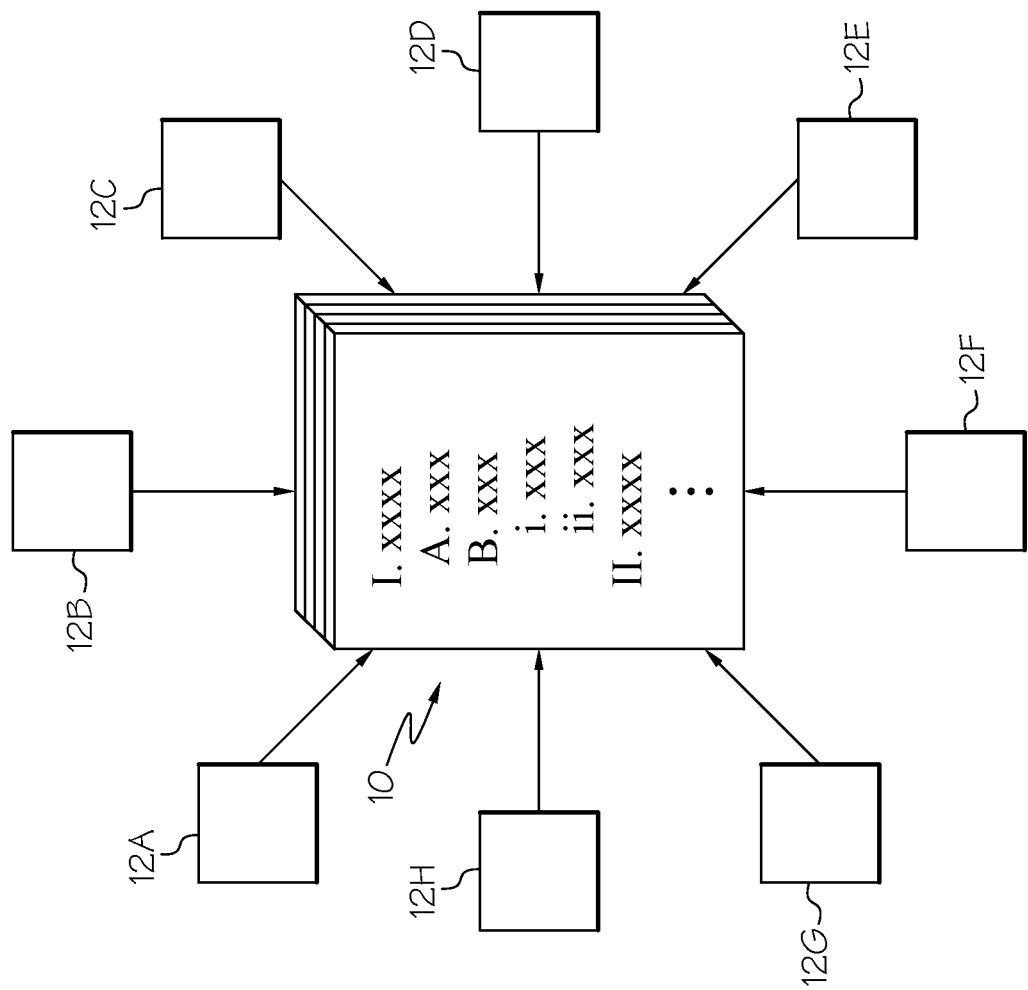
FIG. 1 depicts a schematic illustration of a looseleaf defined by a plurality of content pages containing information from a plurality of sources.

Referring now to FIG. 1, a schematic representation of a looseleaf that is composed of a plurality of content pages 12A-12H from a variety of sources, such as laws, rules, legal opinions, journal articles, treatises, and the like, is illustrated. Although embodiments are described herein in the context of legal looseleafs, embodiments are not limited thereto. For example, embodiments may be directed toward looseleafs of any particular topic (e.g., contracts law). The content pages 12A-12H are hierarchically organized into the looseleaf by sections (i.e., headings) of various levels. As an example and not a limitation, main sections are represented as roman numerals I, II, etc. in FIG. 1, first sub-sections are represented by capital letters A, B, etc., and second sub-sections are represented by lower case letters i, ii, etc. It should be understood that more or fewer main sections and sub-sections may be provided, and that FIG. 1 is provided for illustrative purposes only. In traditional looseleaf services, the main sections and various sub-sections may be provided on guide cards in a binder.

The content of a looseleaf is frequently updated. For example, some content of a looseleaf may be updated or added bi-weekly, weekly or even daily. For example, the content represented by content pages 12A may have recently changed. Therefore, the old content represented by content pages 12A may be replaced with new content represented by content pages 12A. In this manner, the looseleaf is up to date with the most current information.

Figure 2:
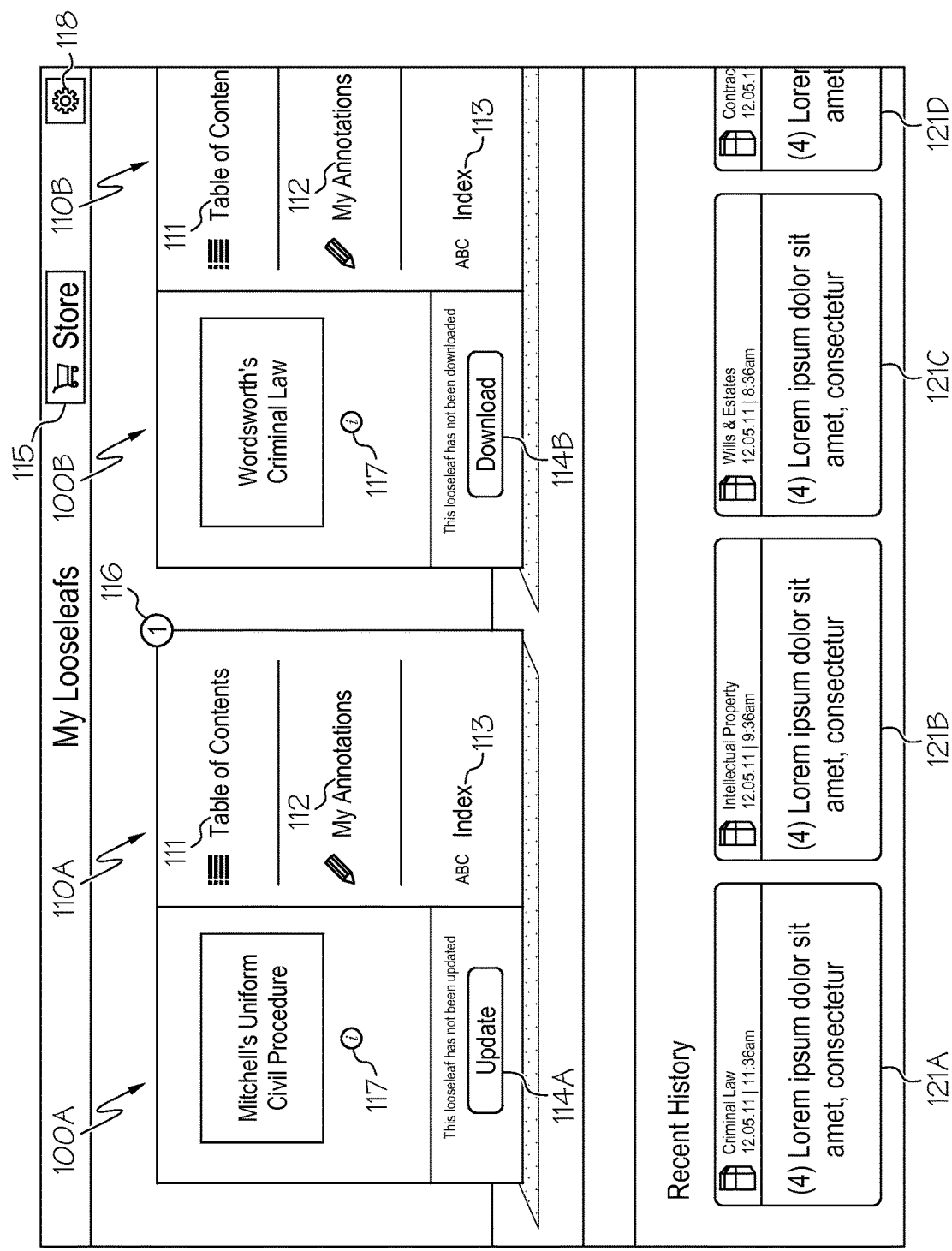
FIG. 2 depicts a schematic illustration of a home screen of an exemplary digital looseleaf e-reader according to one or more embodiments described and illustrated herein.

Embodiments of the present disclosure allow for the display of looseleaf titles and their content on mobile computing devices, such as laptops, tablets, smart phones, ultrabooks, netbooks, and the like. However, it should be understood that embodiments may also allow for the display of looseleafs on non-mobile computing devices, such as desktop computers, for example. Referring now to FIG. 2, an exemplary home screen 101 of a digital looseleaf e-reader application running on a mobile device is depicted. The home screen 101 may also be referred to as a "My Looseleafs" screen because it provides the names of available looseleafs, such as looseleafs stored locally on the mobile computing device, stored remotely (e.g., stored in the cloud), or looseleaf that are available for purchase from an online store. It should be understood that embodiments are not limited to the arrangement of graphical elements displayed throughout the figures as many other configurations are also possible. Additionally, as mobile computing devices such as tablets may be rotated between landscape mode and portrait mode, the graphical elements of the digital looseleaf application may have a different arrangement between the landscape and portrait modes.

In the illustrated embodiment, the home screen 101 includes a Store link 115 in an upper header portion of the screen. Selection of the Store link 115 by a user (e.g., mouse click, or tapping of the touch screen) may cause the mobile computing device to display an online store screen, such as the iTunes Store offered by Apple, Inc., the Google Play store offered by Google, Inc., or a proprietary online store that offers digital looseleafs for purchase.

The illustrated home screen 101 further includes a Settings button 118 that causes the mobile computing device to display a settings screen (not shown) that allows for a user to select various settings, such as, without limitation, font type, font size, display brightness, default launch page when the digital looseleafs application is launched, etc. In some embodiments, the Store link 115 and the Settings button 118 may be present on every screen that is displayed.

The illustrated home screen 101 provides a graphical representation of the digital looseleaf titles that are available to the user, either locally or for download. In the exemplary embodiment depicted in FIG. 2, "Mitchell's Uniform Civil Procedure" digital looseleaf 100A and "Wordsworth's Criminal Law" digital looseleaf 100B are shown. As shown in FIG. 2, the "Wordsword's Criminal Law" digital looseleaf 100B has not been downloaded, as indicated by the Download button 114B that is present. The user may download this particular digital looseleaf 100B by selecting the Download button 114B. As an example and not a limitation the particular digital looseleaf 100B may have been previously purchased by the user, but not yet downloaded to his or her mobile computing device. Alternatively, the particular digital looseleaf 100B may be available for purchase and displayed in the home screen 101. An update icon 116 may be provided to provide an indication that an update is available.

An options menu 110A, 110B is provided for each digital looseleaf 100A, 100B, respectively. As described in more detail below, the options menu 110A, 110B allows a user to view to the table of contents of the particular digital looseleaf ("Table of Contents" link 111), view previously entered annotations of the particular digital looseleaf ("My Annotations" link 112), and view the index of the particular digital looseleaf ("Index" link 113) directly from the home screen 101. In some embodiments, the user may be able to horizontally scroll the portion of the home screen that depicts the graphical representation of the digital looseleafs to reveal graphical representations of additional digital looseleafs. For example, the user may slide his or her finger across the touch screen on the displayed digital looseleafs 100A, 100B from the right to the left to move the displayed digital looseleafs to the left and cause the display of the mobile computing device to display graphical representations of additional digital looseleafs that are positioned to the right of the displayed digital looseleafs 100A, 100B. It should be understood that the graphical representations of digital looseleafs may also be scrolled from left to right, and by use of a mouse or other user input device.

In embodiments, each graphical representation of a digital looseleaf 100A, 100B includes an information button 117 that provides information about the particular digital looseleaf 100A, 100B when selected by the user. Information such as publisher information, update information, information regarding the content of the digital looseleaf, current version number of the digital looseleaf, and the like may be displayed.

In the exemplary home screen 101 depicted in FIG. 2, a Recent History portion 120 of the home screen 101 is provided to give the user a glimpse of recently viewed pages of various digital looseleafs. The Recent History portion 120 may contain recent history summaries 121A-121D that provide information regarding the recently viewed digital looseleafs, such as the pages viewed, the data and time viewed, and portion of text of the pages viewed, etc. The Recent History portion 120 may also be configured to allow a user to scroll left and right to view additional recent history summaries. Selection of a recent history summary 121A-121D may cause the mobile computing device to display the particular digital looseleaf content page described in the selected recent history summary 121A-121D. Accordingly, the home screen 101 may allow the user to quickly view recently viewed digital looseleaf content.

Having introduced an example home screen 101 of a digital looseleaf e-reader application above, a system 200 of producing, distributing and displaying digital looseleaf content is schematically illustrated in FIG. 3A. The diagram illustrating the system 200 depicted in FIG. 3A is described from left to right. It should be understood that the system 200 depicted in FIG. 3A is for illustrative purposes only, and that other system configurations are possible. Information regarding subscriptions for looseleaf content (either traditional paper looseleafs or digital looseleafs) may be stored at a subscription repository or system 206. Such information may include, but is not limited to, looseleaf titles, subscription type (annual subscription, monthly subscription, charge per issue (CPI) subscription, and the like), credential information, mobile computing device ID, etc. The subscription information may be provided to a subscription management system (block 210) that is managed by personnel 208, such as administrators, customer relations personnel, e-commerce personnel, account managers, and the like. For example, personnel may set up and maintain digital looseleaf e-reader accounts within the subscription management system. The subscription management system 210, which may be provided on a computing device, such as a server computing device, provides information to delivery service module block 212 configured to electronically deliver digital looseleafs to customers, as described below.

The digital looseleaf titles may be published and packaged at the digital looseleaf preparation module 202. As an example and not a limitation, digital looseleafs may be packaged and encrypted into digital looseleaf extended markup language ("XML") files for distribution via the delivery service module 212. It should be understood that embodiments are not limited to XML files, and that other file formats may be utilized. The content of the digital looseleaf XML files may be provided by a variety of sources, such as the original publishers of the looseleaf. The packaged digital looseleaf XML files may be stored in a digital looseleaf repository 204 that is accessed by the delivery service module 212. The packaging, encrypting and validating of digital looseleaf XML files, as well as their storage, may be provided by one or more computer server devices, for example. In some embodiments, the digital looseleaf preparation module 202 may be configured to automatically generate a table of contents based on existing and recently updated content. For example, a particular digital looseleaf title may have been updated by inclusion of a new subsection. During digital looseleaf preparation, the digital looseleaf preparation module 202 may automatically update the table of contents associated with the particular digital looseleaf title to include reference to the new sub-section. In this manner, the table of contents for each digital looseleaf title is always up to date.

The delivery service module 212 receives subscription information from the subscription management system 210, and accesses the digital looseleaf repository 204. The delivery service module 212, which may be a combination of hardware and software of a computer server device, for example, retrieves digital looseleaf XML files from the digital looseleaf repository 204 for each subscriber according to the subscription information from the subscription management system 210. The delivery service module 212 may allow a user to download digital looseleaf titles according to his or her subscription, as well as provide the user with updates to his or her digital looseleaf titles when they are available. For example, customer X may receive "Mitchell's Uniform Civil Procedure" digital looseleaf 100A and "Wordsworth's Criminal Law" digital looseleaf 100B according to his or her subscription (e.g., he or she has purchased these titles from an e-store, or these titles are available according to terms of his or her subscription). The delivery service module 212 may allow user X to then download these titles as well as receive updates.

The system 200 depicted in FIG. 3A shows a first, second and third mobile computing device 214A-214C that are used by end-users (i.e., customers). As shown in FIG. 3A, the mobile computing devices 214A-214C may be configured as tablet devices (mobile computing devices 214A and 214B) as well as a laptop device (mobile computing device 214C). The mobile computing device may be any device capable of running the digital looseleaf e-reader application. The delivery service module 212 may be coupled to the individual mobile computing devices 214A-214C by a communications network, such as the Internet via wired and/or wireless connections. Users may receive digital looseleafs from the delivery service module 212, as well as provide information to the subscription management system 210 via the communications network and the delivery service module 212. The mobile computing device 214A-214C may be communicatively coupled to one or more online stores 216A-216C to purchase digital looseleafs depending on the type of mobile computing device. Exemplary online stores include, but are not limited to, the iTunes store offered by Apple, Inc., Google Play offered by Google, Inc., as well as proprietary online stores. Users may access the online stores 216A-216C to purchase digital looseleaf content as well as manage their subscriptions, for example.

Figure 3B:
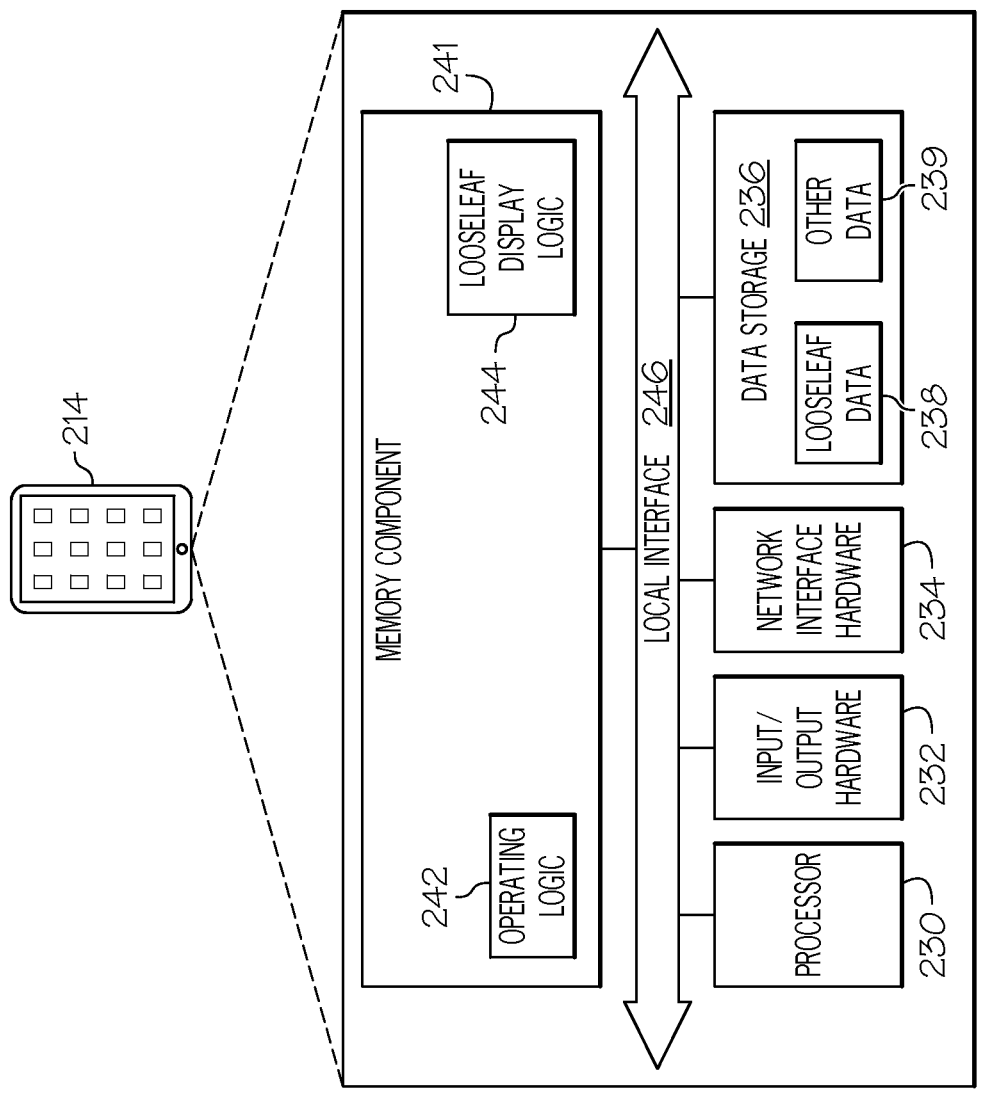
FIG. 3B depicts a schematic illustration of components of an exemplary mobile computing device according to one or more embodiments described and illustrated herein.

FIG. 3B schematically depicts exemplary components of an example mobile computing device 214 operable to execute the digital looseleaf e-reader applications described herein. It should be understood that the components of the mobile computing device 214 depicted in FIG. 3B are provided for illustrative purposes only as the mobile computing device may take on many forms. Accordingly, it should be understood that the components illustrated in FIG. 3B are merely exemplary and are not intended to limit the scope of this disclosure.

The mobile computing device may include a processor 230, input/output hardware 232, network interface hardware 234, a data storage component 236 (which may store digital looseleaf data 238 as well as other data 239) and a memory component 241. The memory component 241 may be configured as volatile and/or nonvolatile computer readable medium and, as such, may include random access memory (including SRAM, DRAM, and/or other types of random access memory), flash memory, registers, and/or other types of storage components. Additionally, the memory component 241 may be configured to store operating logic 242 (e.g., the operating system of the mobile device), and digital looseleaf application logic 244 (each of which may be embodied as computer readable program code, firmware, or hardware, as an example). A local interface 246 is also included in FIG. 3A and may be implemented as a bus or other interface to facilitate communication among the components of the mobile computing device 214. It should be understood that the memory component 241 and the data storage component 236 may be configured as a single computer readable medium component rather than distinct computer readable medium components.

The processor 230 may include any processing component configured to receive and execute computer readable code instructions (such as from the data storage component 236 and/or memory component 241). The input/output hardware 232 may include a graphics display device, keyboard, mouse, touch screen, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices, such as the delivery service module 212.

As illustrated in FIG. 3B, the data storage component 236 may store digital looseleaf data 238, which in at least one embodiment includes digital looseleaf documents (e.g., digital looseleaf XML files). The digital looseleaf documents may be directed to different topics, such as legal subjects, for example. Other data 239 may be stored in the data storage component 236 to provide support for functionalities described herein.

Included in the memory component 241 may be the operating logic 242, and the digital looseleaf application logic 244. The operating logic 242 may include an operating system and/or other software for managing components of the mobile computing device 214 (e.g., iOS provided by Apple, Inc. or Android provided by Google, Inc.). The operating logic may also include computer readable program code for displaying the graphical user interface. Similarly, the digital looseleaf application logic 244 may reside in the memory component 241 and may be configured to facilitate display of electronic digital looseleafs in an e-reader environment.

Figure 4:
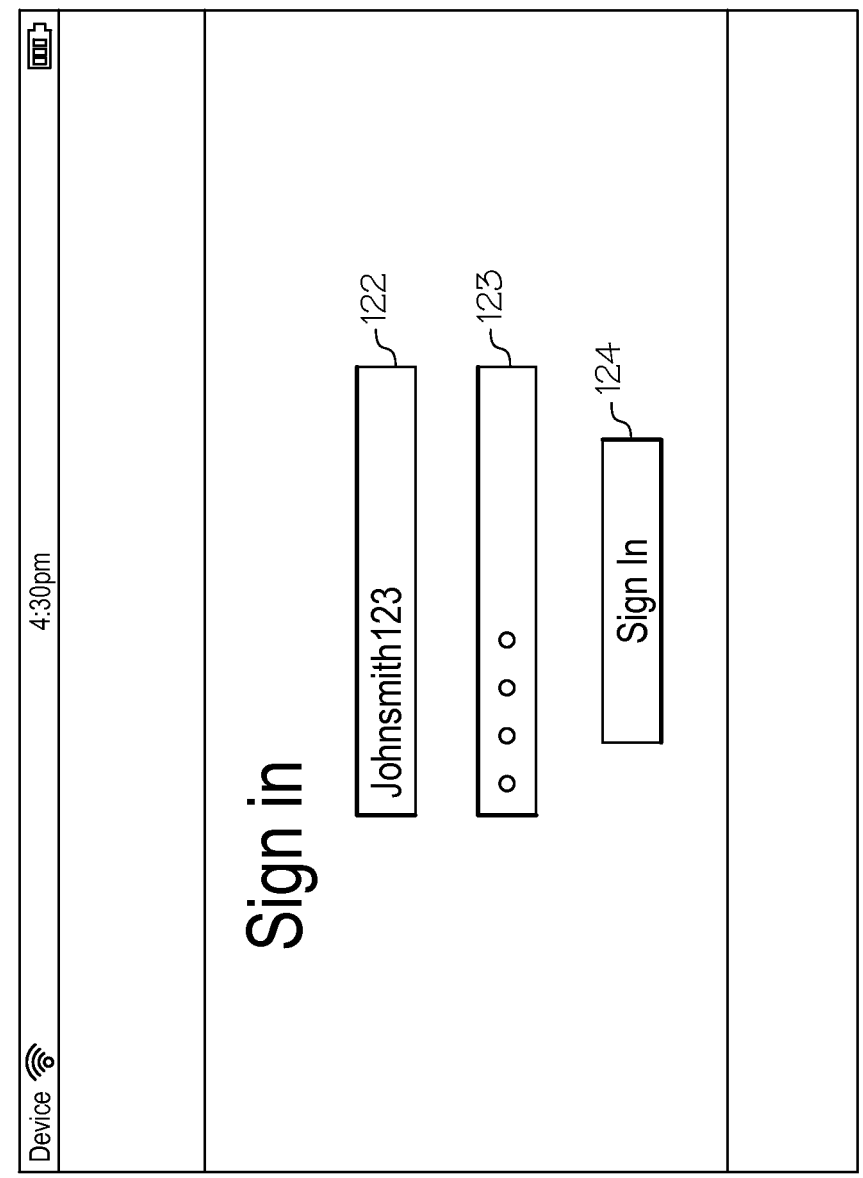
FIG. 4 depicts a schematic illustration of an exemplary login screen of a digital looseleaf e-reader according to one or more embodiments described and illustrated herein.

Referring now to FIG. 4, an exemplary login screen 102 of a digital looseleaf e-reader application is illustrated. A user may provide his or her credentials into the login screen 102 to gain access to the digital looseleaf e-reader application and associated digital looseleafs. For example, the login screen 102 may prompt the user to enter his or her user name or e-mail address into a user name text field 122, and a password into a password text field 123. These credentials may be verified locally on the mobile computing device 214. If the mobile computing device 214 is connected to the Internet, the credentials may be checked against the subscription management system 212. As an example and not a limitation, if it is the first time that the user has signed in, the user may be prompted to change his or her password. The new password and device ID may then be associated with the user's mobile computing device 214. If the credentials cannot be verified, an error message may be shown and an option to reset the password by e-mail may be presented to the user on the display of the mobile computing device 214.

Figure 5:
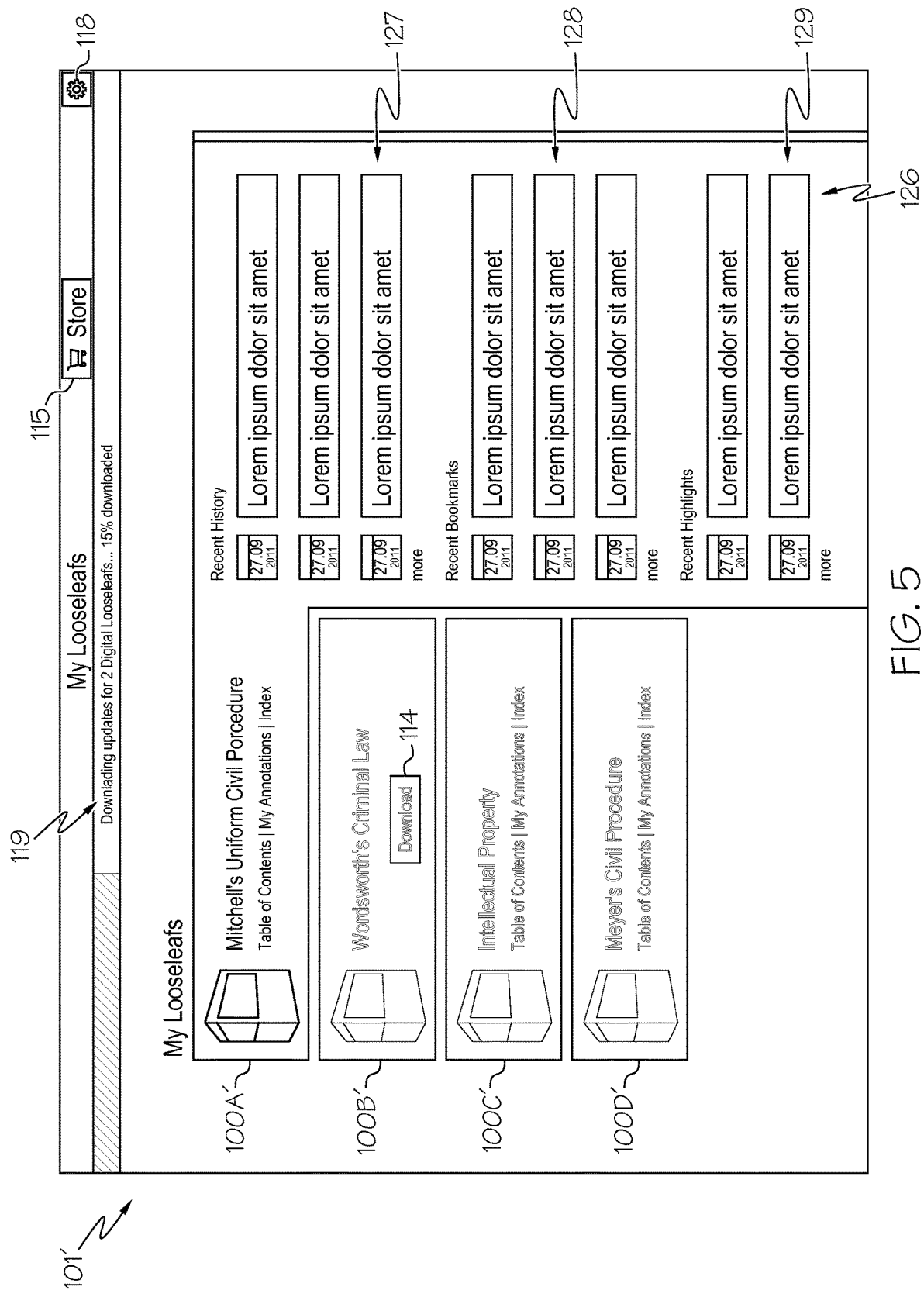
FIG. 5 depicts a schematic illustration of an exemplary home screen of an exemplary digital looseleaf e-reader according to one or more embodiments described and illustrated herein.

After the credentials of the user have been verified, the home screen (i.e., My Looseleafs screen) is displayed to the user. Referring now to FIG. 5, an example home screen 101' is illustrated. The home screen 101' depicted is an alternative embodiment of the home screen 101 depicted in FIG. 2. It should be understood that other configurations are also possible. In the home screen 101' depicted in FIG. 5, the graphical representations of digital looseleafs 100A'-100D' are arranged vertically. When a user taps or otherwise selects an individual digital looseleaf 100A'-100D', a summary 126 that is associated with the selected digital looseleaf may be displayed. The summary 126 may display information that is relevant to the selected digital looseleaf, such as Recent History 127 (content pages recently viewed by the user), Recent Bookmarks 128 (recent bookmarks saved by the user) and Recent Highlights 129 (recent text highlighted by the user using annotation functionality). More information may also be provided in the summary 126 display. Selection of the entries provided in the summary 126 display by the user may cause the relevant content (e.g., recently viewed content page, bookmarked content page, highlighted text of a content page) to be displayed.

In the embodiment depicted in FIG. 5, a status 119 displays that there are updates for digital looseleafs available for download. A user may download a digital looseleaf, as well as any updates, by selecting the Download button 114 (or update button) associated with a digital looseleaf.

Figure 6:
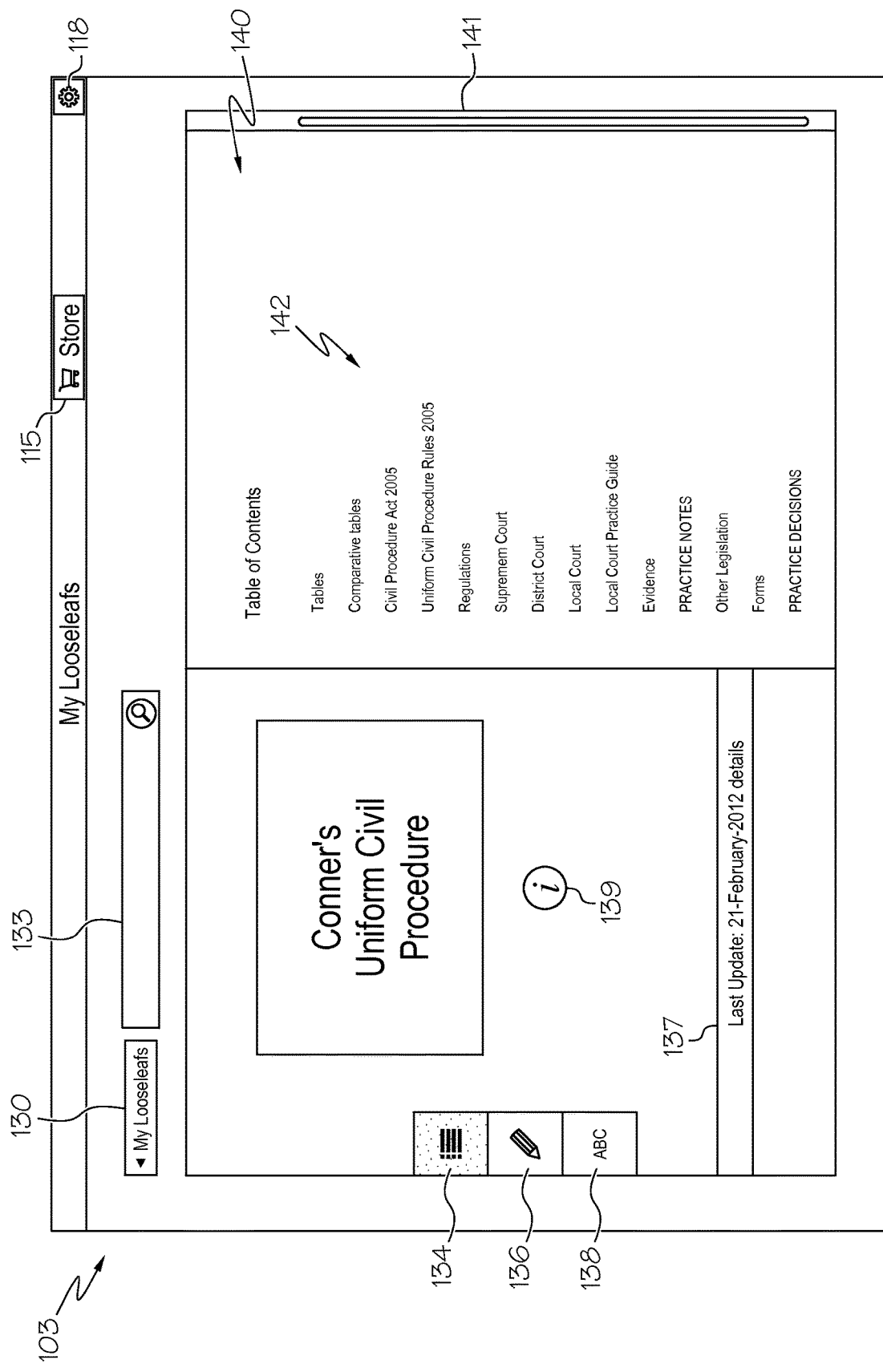
FIG. 6 depicts a schematic illustration of an exemplary table of contents screen of an exemplary digital looseleaf e-reader according to one or more embodiments described and illustrated herein.

Referring to FIG. 6, selection (e.g., double tapping, double clicking or other method) a graphical representation of a digital looseleaf 100A'-100D' causes the mobile computing device 214 to display a digital looseleaf table of contents screen 103 for the selected digital looseleaf. Generally, the example table of contents screen 103 displays the title of the selected digital looseleaf (e.g., "Conner's Uniform Civil Procedure"), a navigation button 130 to return the user to the home screen, a search text field 133 (e.g., a text prompt) for receiving a user-entered search query, a first table of contents page 140, option buttons 134, 136, and 138 and update summary 137.

Figure 8A:
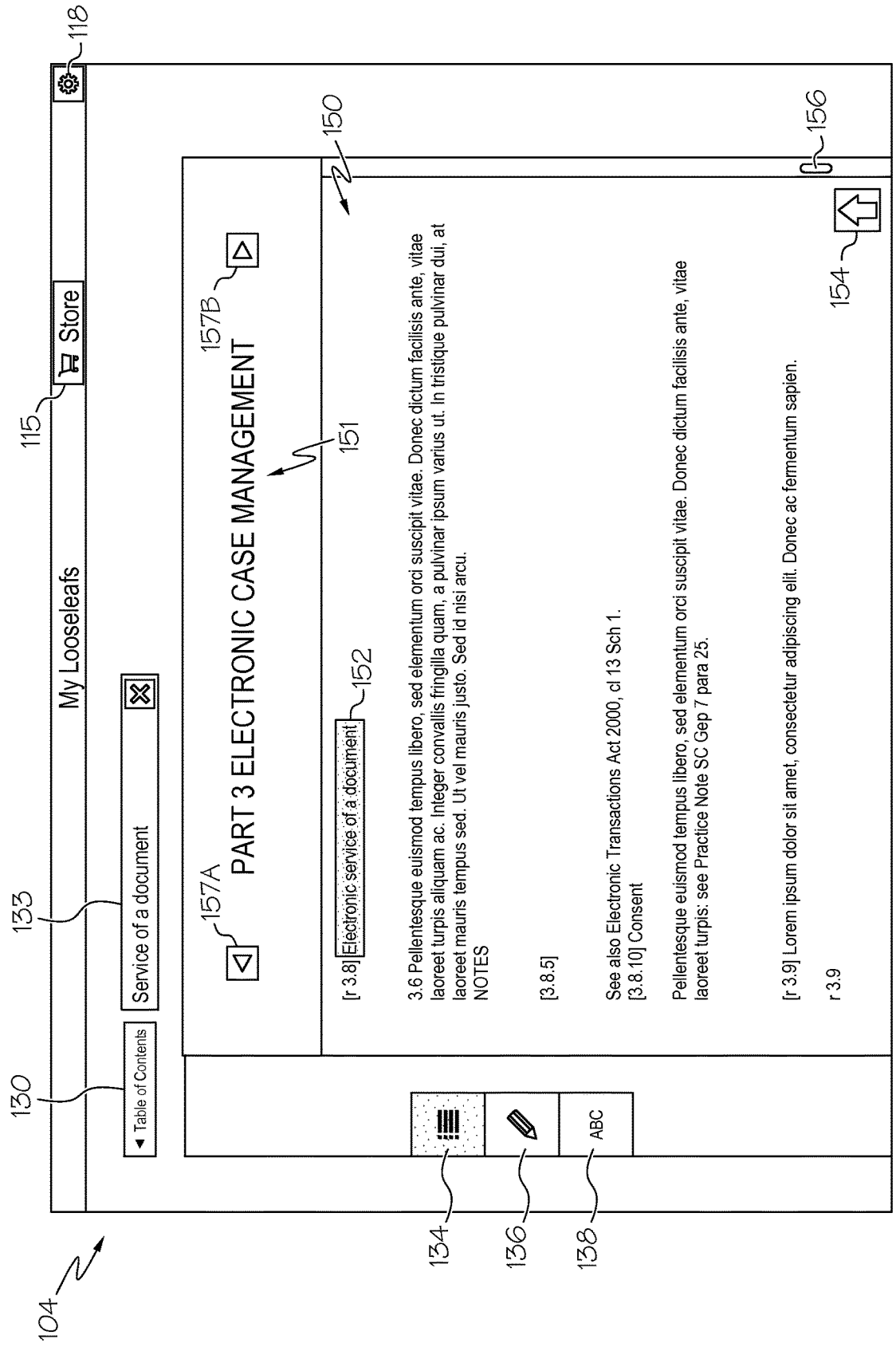
FIG. 8A depicts a schematic illustration of an exemplary content page screen of an exemplary digital looseleaf e-reader according to one or more embodiments described and illustrated herein.

The search text field 133 prompts a user to enter a search query to search for terms within the selected digital looseleaf. For example, as shown in FIG. 8A, the user has entered the phrase "service of a document" into the search text field 133, which then displays a content page 150 containing this phrase.

Still referring to FIG. 6, an information button 139 may also be provided to display miscellaneous information, such as publication information, description of the digital looseleaf, last update date of the digital looseleaf, current version number of the digital looseleaf, etc. Additionally, the update summary 137 may provide the user with update information at a glance. The functional buttons of the illustrated embodiment include a table of contents button 134, which displays the table of contents page(s) of the selected digital looseleaf. It is noted that the table of contents button 134 is selected in the illustrated main screen such that the first table of contents page 140 is displayed. As described in more detail below, the functional buttons also include an annotations button 136 that, when selected by the user, provides annotation functionalities, and an index button 138, that displays index information regarding the selected digital looseleaf.

As described above, the content of looseleafs is hierarchically organized main sections and multiple layers of sub-sections. In paper looseleafs, the main sections and sub-sections are denoted by guidecards within a looseleaf binder. In the digital looseleafs described herein, the main sections and sub-sections are displayed in multiple table of contents pages. In FIG. 6, a first table of contents page 140 displaying a plurality of main sections 142 of the selected digital looseleaf is displayed. The main sections 142 represent the top-most level sections of the selected digital looseleaf. Exemplary main section titles are shown in FIG. 6. It should be understood that the main sections will depend on the content of the particular digital looseleaf. A scroll indicator 141 may be provided on the first table of contents page 140 (as well as subsequent table of contents pages) to indicate a position within the first table of contents page 140.

Figure 7:
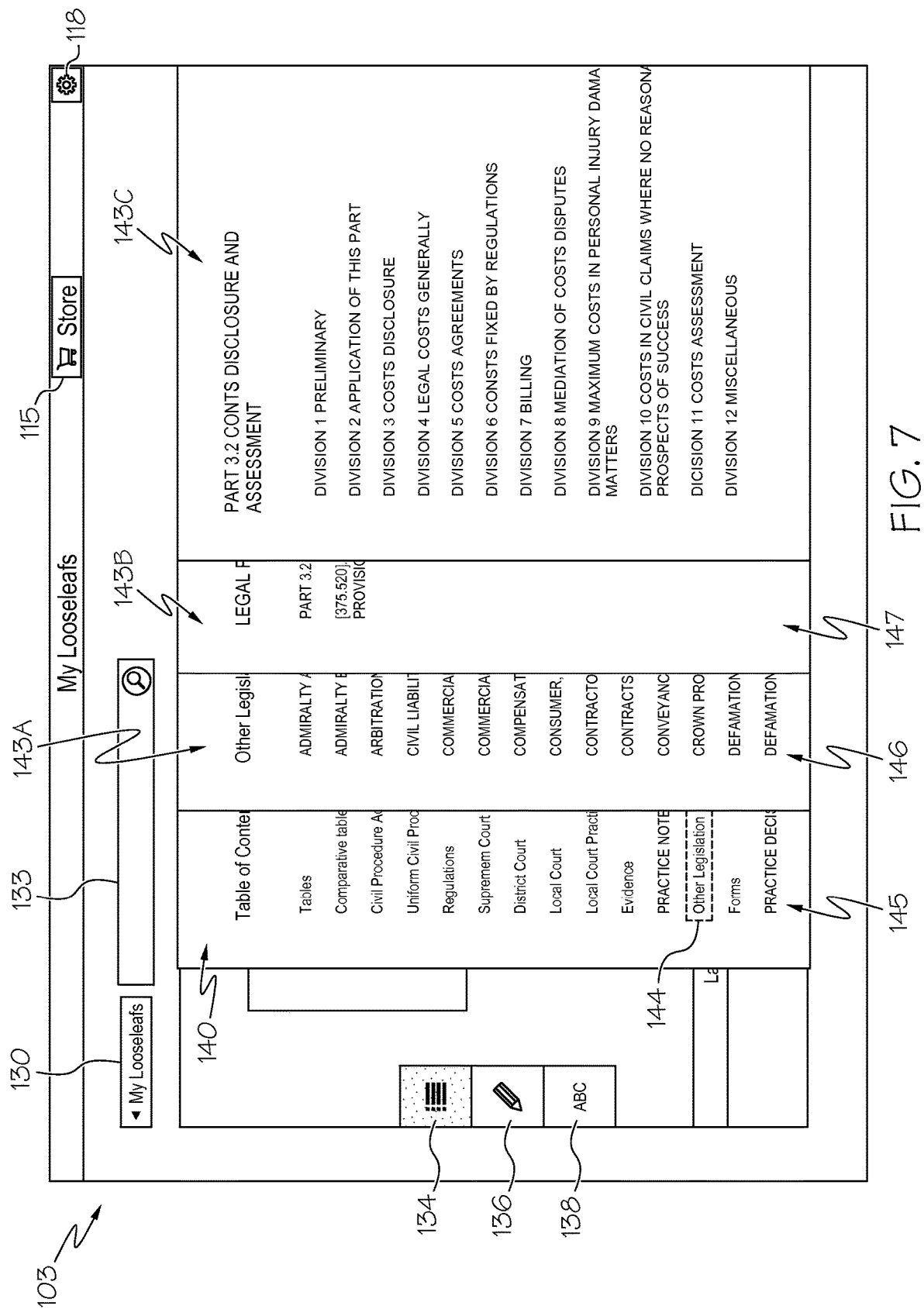
FIG. 7 depicts a schematic illustration of the exemplary table of contents screen of FIG. 6 with overlapping table of contents pages.

Selection of an individual main section within the first table of contents page 140 may cause a second table of contents page to be displayed overtop of the first table of content page unless there are no sub-sections under the selected main section. If there are no sub-sections under a selected main section (or sub-section), the content page including the text associated with the selected main section (or sub-section) is displayed. Referring now to FIG. 7, a table of contents screen 103 with several table of contents pages displayed is illustrated. The first table of contents page 140 that was depicted in FIG. 6 is partially visible on the left side of the display. As an example, the user has selected the "Other Legislation" main section as indicated by dashed enclosed region 144. A second table of contents page 143A displaying a plurality of sub-sections associated with the selected main section (e.g., "Other Legislation") is displayed overtop the first table of contents page 140 such that a majority of the first table of contents page 140 to be obstructed. However, an edge portion 145 of the first table of contents page 140 is still visible and unobstructed by the second table of contents page 143A. Similarly, a third table of contents page 143B is displayed overtop the second table of contents page 143A (in response to selection of a sub-section of the second table of contents page 143A) such that an edge portion 146 of the second table of contents page 143A is visible, and a fourth table of contents page 143C is displayed overtop the third table of contents page 143B (in response to a selection of a sub-section of the second table of contents page 143B) such that an edge portion 147 of the third table of contents page 143B is visible.

The overlapping arrangement of the table of contents pages 140, 143A-143C allows a user to visualize the organization of desired portions of the digital looseleaf without the use of a large hierarchical tree that may be difficult to display on a mobile computing device display. Only the content relevant to the user is displayed on the screen of the mobile computing device via the overlapping table of content pages. A user may move back to a previous table of contents page by touching (or clicking) its edge portion (e.g., edge portion 145, 146 or 147) and therefore quickly navigate to desired content without being required to navigate many different screens. For example, the user may decide to view the content of a "Defamation" sub-section under the "Other Legislation" main section from the view depicted in FIG. 7. He or she may touch (or click) the edge portion 146 of the second table of contents page 143A that is unobstructed by the third table of contents page 143B, and then select a "Defamation" sub-heading, followed by one or more sub-headings presented on one or more additional table of contents pages.

Sub-sections that do not have subsequent sub-sections associated with them are configured as content links that, when selected by the user, displays the appropriate content page of the selected sub-section rather than additional table of content pages. Accordingly, a user may drill down to the desired content using the overlapping table of contents pages. Still referring to FIG. 7, and as an example, selection of the "DIVISION 3 COSTS DISCLOSURE" sub-section on the fourth table of contents page 143C may cause the content page of this selected sub-section to be displayed because there are no more sub-sections associated with it.

FIG. 8A illustrates an exemplary content page screen 104 of a digital looseleaf. The content page 104 provides the actual content of a section or sub-section of a selected digital looseleaf. A user may arrive at a desired content page 104 by using the table of contents as described above and illustrated in FIGS. 6 and 7. The content page screen 104 displays the text of the selected section or sub-section. The sub-section title 151 of the content page screen 104 may be displayed. The navigation button 130 may allow a user to quickly return to the table of contents screen 103 for selection of another content page. A scroll indicator 156 may be provided to give the user visual feedback as to the current position of the content page screen 104 being displayed. A top of the page button 154 may also be provided to allow the user to quickly move to the top of the content page 104. A section back button 157A and a section forward button 157B may be provided to allow the user to move backward and forward between sub-sections without needing to return to the table of contents screen 103. It is noted that the option buttons 134, 136 and 138 are also visible in the content page screen 104.

Figure 8B:
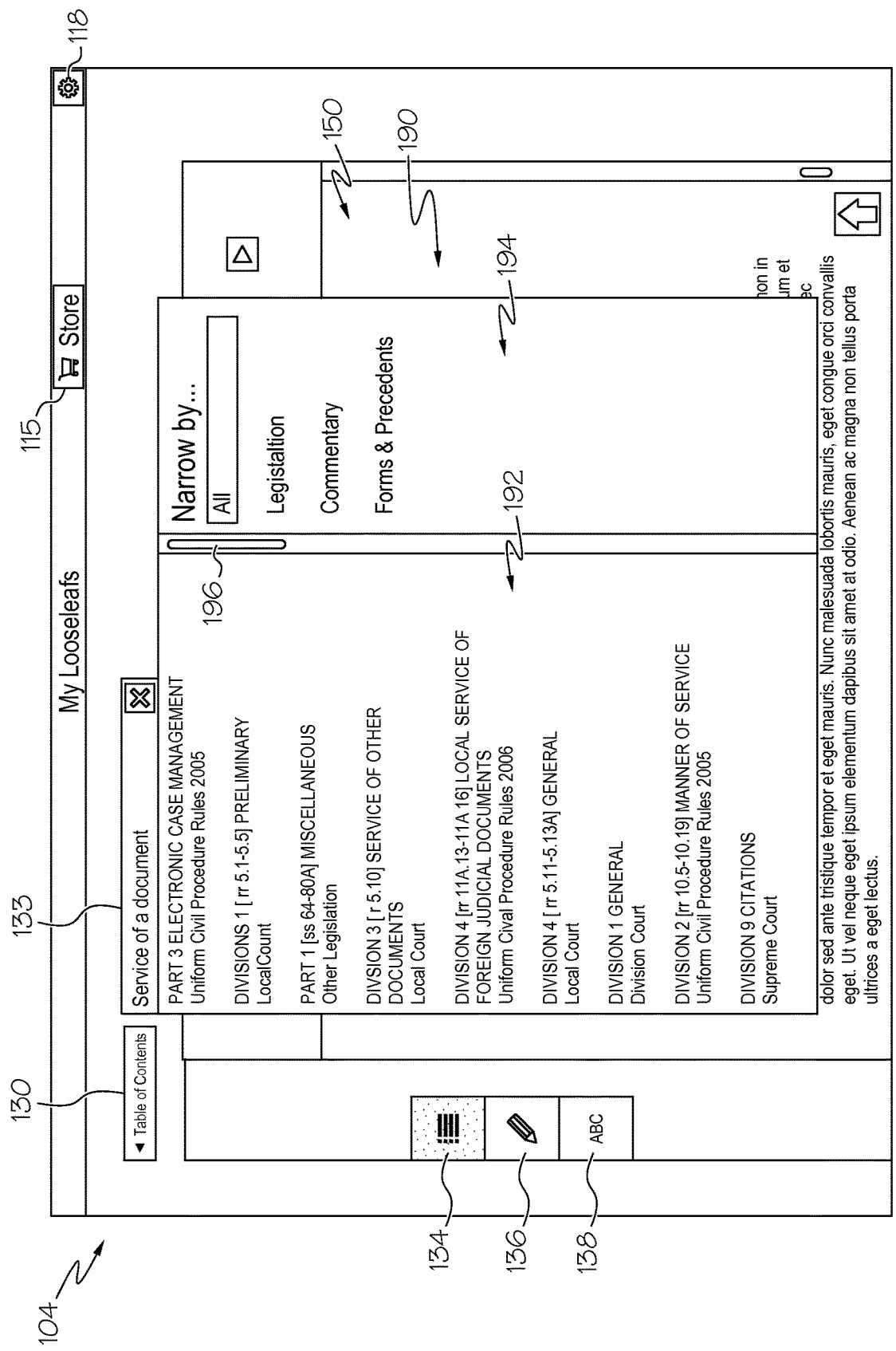
FIG. 8B depicts a schematic illustration of the content page screen depicted in FIG. 8A with a search results menu displayed according to one or more embodiments described and illustrated herein.

The text of an opened digital looseleaf may be searched in any screen having the search text field 133. In the illustrated embodiment, the user has typed "Service of a document" into the search text field 133, which has highlighted the phrase 152 in the text of the content page screen 104. Referring now to FIG. 8B, a results menu 190 may be displayed when a user enters a search query into the search text field 133. The results menu 190 may be displayed over the current screen that is displayed. In the illustrated embodiment, the results menu 190 is shown as overlapping the content page screen 104 because the user entered text into the search text field 133 of a contents page screen 104. After the user has entered some text into the search text field 133, a list of search results 192 may be shown. The user may scroll through the list of search results 192 using the touch-screen, mouse or other input device. A scroll indicator 196 may be provided to give visual feedback as to the displayed position within the results menu 190. Additionally, a "Narrow by" menu 194 may be provided to allow the user to narrow his or her search results to a particular category of content, such as legislation content, commentary content, forms and procedures, statutes, and the like. When a user selects one of these categories in the "Narrow by" menu, only results meeting the selected category will be displayed in list of search results 192. Selection of one of the results in the list of search results 192 brings up the corresponding content page screen 104.

Figure 9:
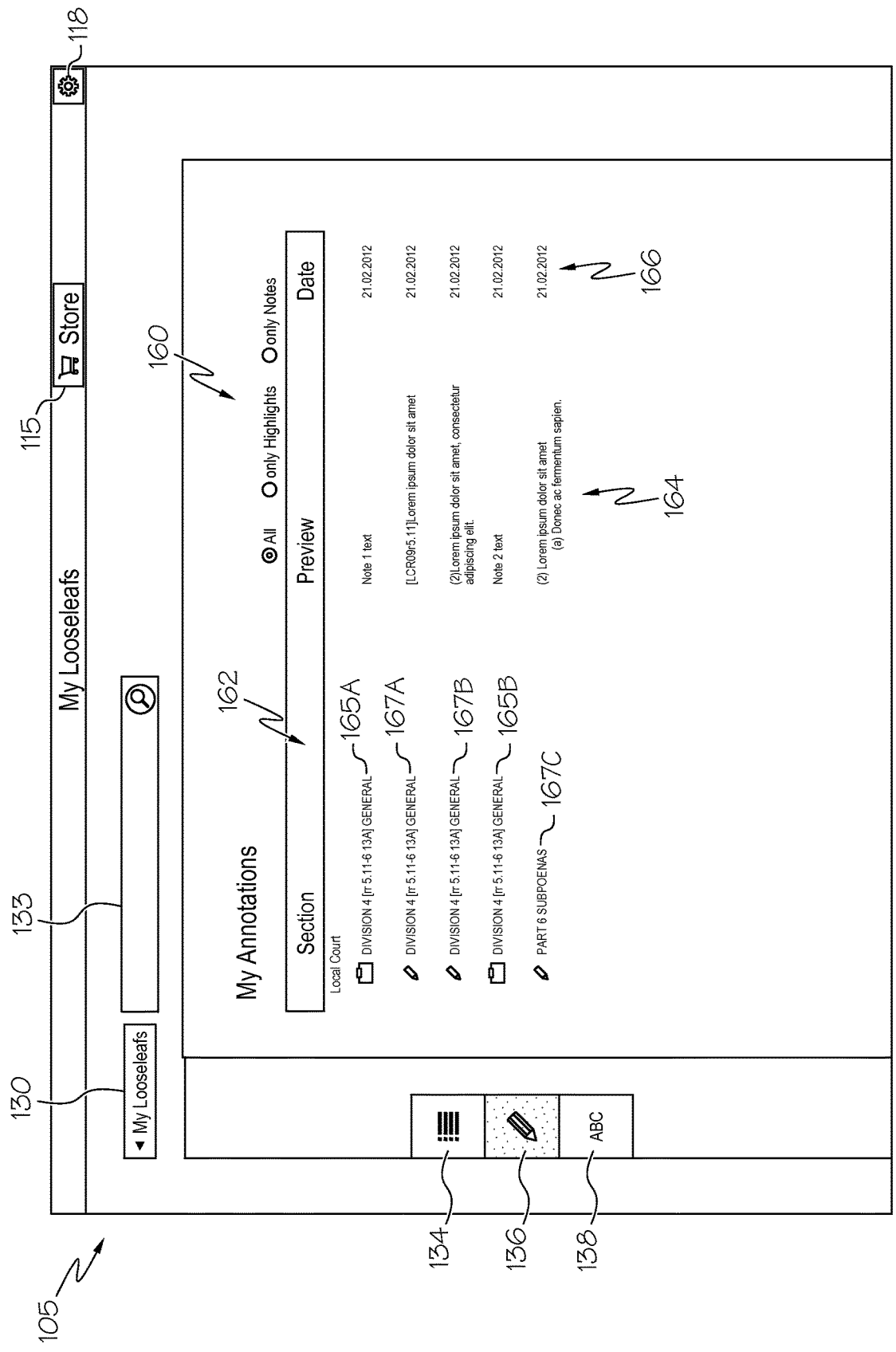
FIG. 9 depicts a schematic illustration of an exemplary annotations screen of an exemplary digital looseleaf e-reader according to one or more embodiments described and illustrated herein.

Referring now to FIG. 9, embodiments may allow a user to annotate portions of his or her digital looseleafs. Selection of the annotations button 136 may cause the mobile computing device 214 to display an annotations screen 105. The annotations screen 105 displays all of the saved annotations that the user has made in the selected digital looseleaf. Annotations may be in the form of highlighted text, notes, audio notes, and the like. For example, a user may select portions of text with his or finger, or using a mouse. The selected text may be highlighted and saved for later display. Additionally, text may be copied to the clipboard memory, pages and paragraphs may be bookmarked for later access, and pages may be e-mailed/shared. These annotation options may be provided in a pop-up or other menu (not shown).

In some embodiments, the user may select to display both highlighted text and notes, only highlighted text, or only notes using selection options 160. In the illustrated embodiments, the annotation screen 105 is set to display both highlighted text and notes. Portion 162 of the annotations screen 105 displays the section (i.e., main section or sub-section) in which the highlighted text or note appears. Annotation indicators 165A and 165B correspond to notes, while annotation indicators 167A-167C correspond to highlighted text. Portion 164 of the annotations screen 105 displays a preview of the text of the highlights text, or a preview of the saved notes. Portion 166 of the annotations screen 105 displays the date on which the highlighted text was selected or the date on which the note was created and saved.

Figure 10:
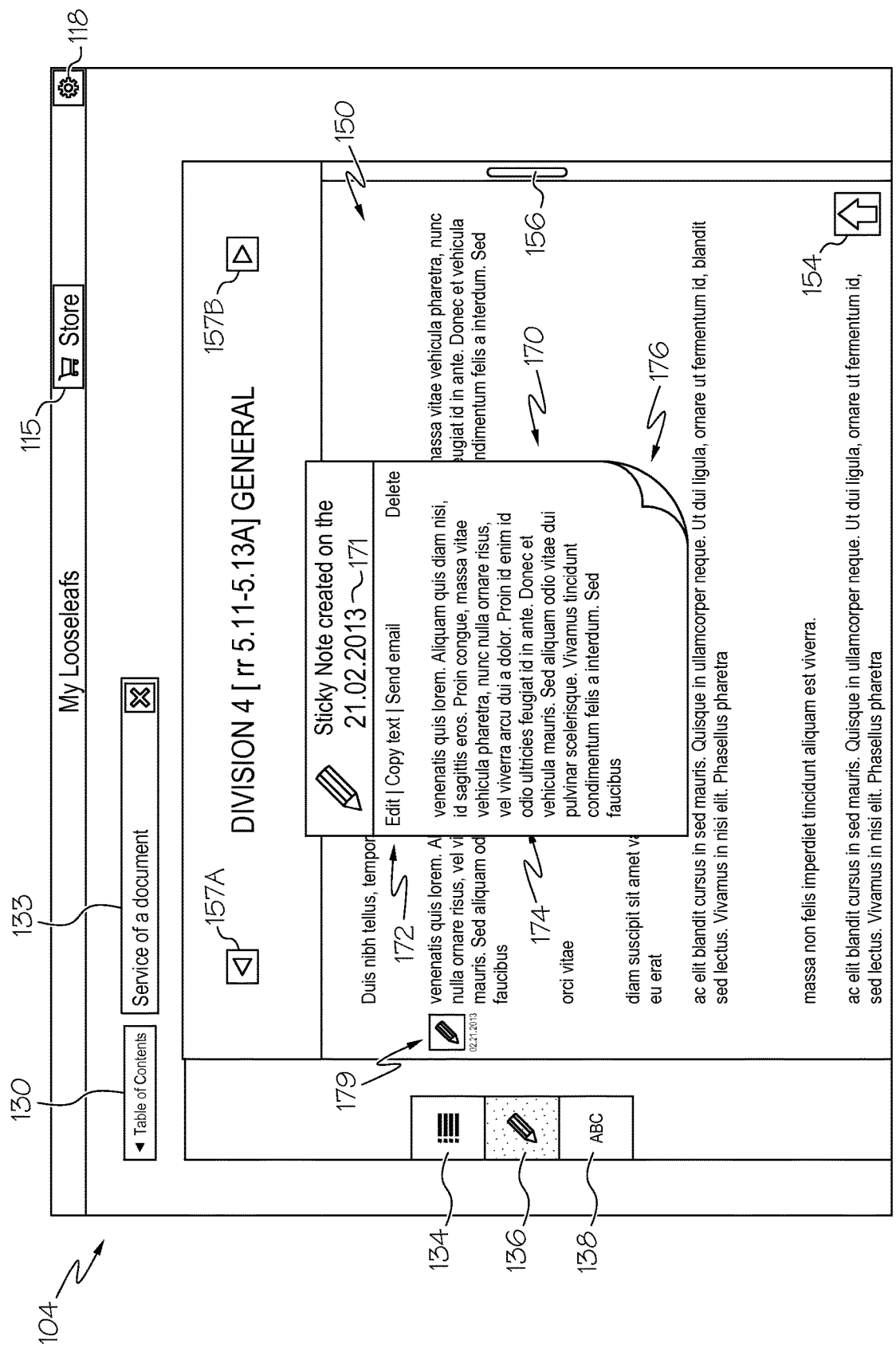
FIG. 10 depicts a schematic illustration of an exemplary content page with an exemplary annotation note displayed thereon according to one or more embodiments described and illustrated herein.

FIG. 10 illustrates an example of a note 170 corresponding to selected text of a content page screen 104. The note 170 may be created by selecting text within the content page screen 104 and selecting an add note option from a menu, for example. In the illustrated embodiment, the note is graphically represented by a sticky note that appears overtop the content page screen 104, and has a note text region 174, an options region 172, and a date region 171 that displays the date on which the note 170 was created. The user may type text into the text region 174 of the note. The options region 172 may provide the user with various options, such as editing the text of the note 170 after it has been saved, copying the text of the note to the clipboard memory of the mobile computing device, sending the text of the note 170 in an e-mail, or deleting the note 170. Other options are also possible. In some embodiments, a corner 176 of the note 170 appears to peel back to give the appearance of a real sticky note. The user may, for example, remove the note 170 from content page screen 104 by touching the corner 176 and moving his or her finger toward the opposite top corner to "peel" the sticky note 170 off of the screen and reveal the underlying content page screen 104. A graphical representation 179 of the note 170 may appear next to the paragraph of the text associated with the note 170 to indicate to the user that a note regarding the particular paragraph is saved. User selection of the graphical representation 179 of the note 170 may cause the note 170 to reappear on the display as shown in FIG. 10.

Figure 11:
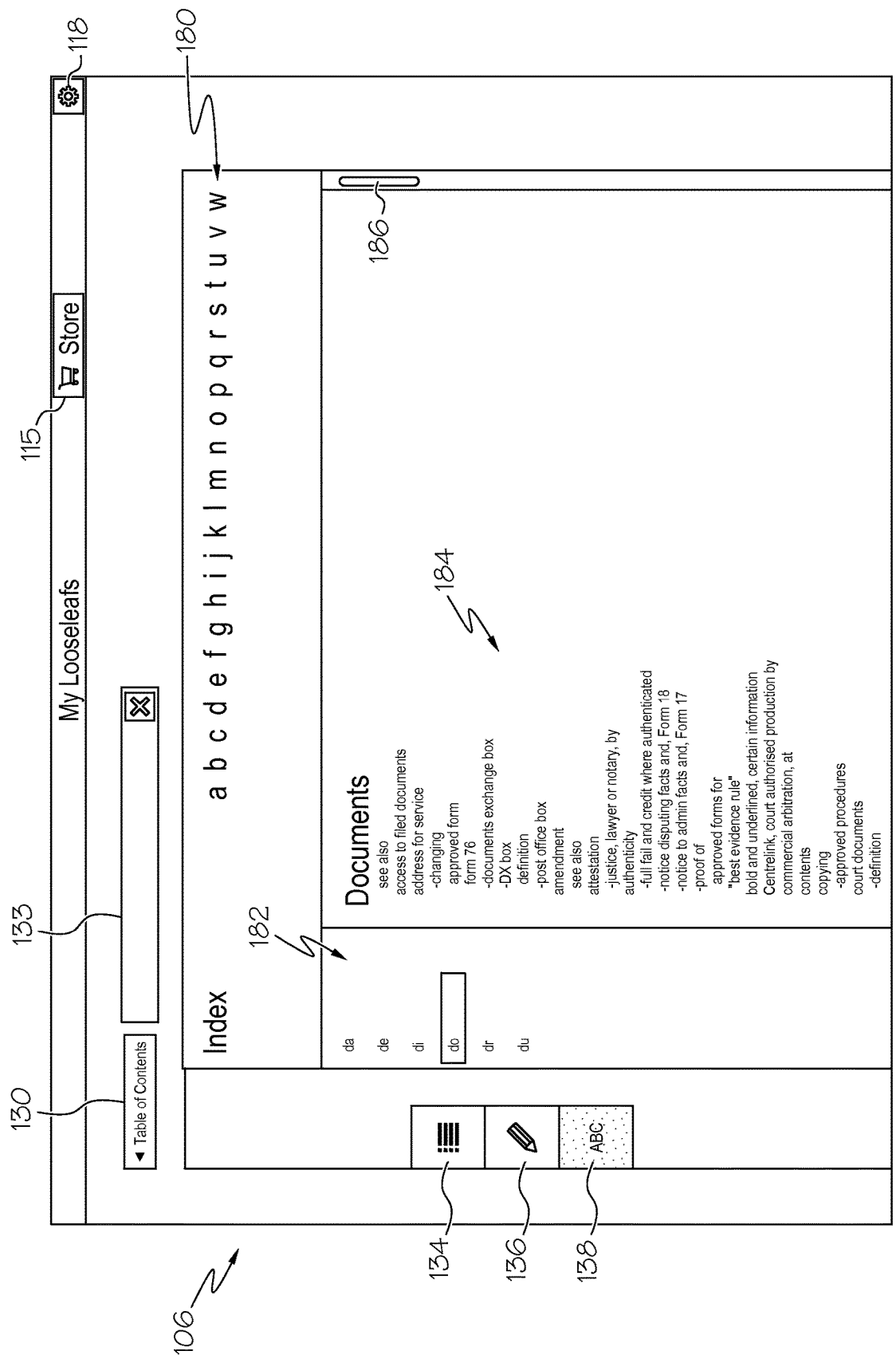
FIG. 11 depicts a schematic illustration of an exemplary index screen of an exemplary digital looseleaf e-reader according to one or more embodiments described and illustrated herein.

Referring now to FIG. 11, selection of the index button 138 may cause the mobile computing device 214 to display the index screen 106. A user may operate the index screen 106 as an index of a book to search for certain key words and concepts. Index terms and phrases are provided in a results list 184. In the illustrated embodiment, an alphabet portion 180 is displayed that provides the letters of the alphabet. It is noted that if a letter does not appear as the first letter of a term or phrase in the index, it is not displayed in the alphabet portion (e.g., the letter "z" in the illustrated embodiment). A user may also choose to scroll a results list 184 rather than using the alphabet portion to jump to terms having a certain letter.

In some embodiments, selection of a letter causes an additional selection menu 182 to be displayed that lists the letter chosen as well as second letter options (e.g., "da," "de," "di," etc.) of index terms and phrases having the selected letter as the first letter. Selection of a first and second letter in the additional selection menu 182 causes a results list 184 to be updated with index terms and phrases having the selected first and second letters (e.g., selection of "do" in the illustrated embodiment causes "documents" to appear in the results list 184). Selecting an item in the results list 184 may take the user directly to the content page screen associated with the item selected.

It should be understood that embodiments described herein enable professionals to conveniently view frequently updated looseleaf content on mobile computing devices, such as tablets and laptop computers, when offline or online. Embodiments may enable legal organizations to lower costs of filing, managing and storing looseleaf publications, which may be organized and stored in the legal organization's library. Embodiments also allow a user to quickly and efficiently review the table of contents of digital looseleafs by use of interactive table of content pages that are displayed in an overlapping arrangement.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer program product comprising:
   a non-transitory, processor-readable storage medium having computer readable instructions embodied therein for displaying information relating to one or more digital looseleafs, the computer readable instructions, when executed by a processor, cause the processor to:
   display a first table of contents page of a digital looseleaf on a computer display, wherein:
      the digital looseleaf comprises hierarchically organized content; and
      the first table of contents page displays a representation of a plurality of main sections associated with the hierarchically organized content;
   receive a user selection of a representation of an individual one of the plurality of main sections;
   automatically generate a second table of contents page in response to the user selection, wherein the second table of contents page contains existing content that has been updated in real time from information received from a publisher;
   display the second table of contents page overtop the first table of contents page such that an edge portion of the first table of contents page is unobstructed by the second table of contents page, wherein the edge portion contains at least a portion of the representation of the plurality of main sections and the second table of contents page displays a representation of a plurality of first sub-sections associated with the selected representation of the individual one of the plurality of main sections; and
   in response to receipt of a user input in the edge portion of the first table of contents page, display an entirety of the first table of contents page.

2. The computer program product of claim 1, wherein the computer readable instructions further cause the processor to, in response to receipt of a user selection of a representation of an individual one of the plurality of first sub-sections, display a third table of contents page overtop the second table of contents page such that an edge portion of the second table of contents page is unobstructed by the third table of contents page and the edge portion of the first table of contents page is unobstructed by the second table of contents page, wherein the third table of contents page displays a representation of a plurality of second sub-sections associated with the selected representation of the individual one of the plurality of first sub-sections.

3. The computer program product of claim 2, wherein the computer readable instructions further cause the processor to, in response to receipt of a user input in the edge portion of the second table of contents page, display an entirety of the second table of contents page such that the edge portion of the first table of contents page is unobstructed by the second table of contents page.

4. The computer program product of claim 1, wherein:
   one or more of the plurality of main sections, one or more of the plurality of first sub-sections, and/or one or more additional sub-sections of a plurality of additional sub-sections associated with one or more additional table of contents pages are configured as a content link associated with a content page; and
   wherein the computer readable instructions further cause the processor to, in response to receipt of a user selection of an individual content link, display an individual content page associated with the individual content link.

5. The computer program product of claim 4, wherein the computer readable instructions further cause the processor to, in response to receipt of a user input, display highlighted portions of text within one or more content pages.

6. The computer program product of claim 4, wherein the computer readable instructions further cause the processor to, in response to receipt of a user input, display annotation text entered by a user.

7. The computer program product of claim 1, wherein the computer readable instructions further cause the processor to display updates to one or more digital looseleafs.

8. The computer program product of claim 1, wherein the one or more digital looseleafs are received from a digital looseleaf delivery service.

9. A method in a computer system for displaying information relating to a digital looseleaf, the method comprising:
   presenting a first table of contents page of the digital looseleaf, wherein:
      the digital looseleaf comprises hierarchically organized content; and
      the first table of contents page comprises a representation of a plurality of main sections associated with the hierarchically organized content;
   receiving a user selection of a representation of an individual one of the plurality of main sections;
   automatically generating a second table of contents page in response to the user selection, wherein the second table of contents page contains existing content that has been updated in real time from information received from a publisher;
   presenting the second table of contents page overtop the first table of contents page such that an edge portion of the first table of contents page is unobstructed by the second table of contents page, wherein the edge portion contains at least a portion of the representation of the plurality of main sections and the second table of contents page comprises a representation of a plurality of first sub-sections associated with the selected representation of the individual one of the plurality of main sections; and
   in response to receipt of a user input in the edge portion of the first table of contents page, presenting an entirety of the first table of contents page.

10. The method of claim 9, further comprising, in response to receipt of a user selection of a representation of an individual one of the plurality of first sub-sections, presenting a third table of contents page overtop the second table of contents page such that an edge portion of the second table of contents page is unobstructed by the third table of contents page and the edge portion of the first table of contents page is unobstructed by the second table of contents page, wherein the third table of contents page comprises a representation of a plurality of second sub-sections associated with the selected representation of the individual one of the plurality of first sub-sections.

11. The method of claim 10, further comprising, in response to receipt of a user input in the edge portion of the second table of contents page, presenting an entirety of the second table of contents page such that the edge portion of the first table of contents page is unobstructed by the second table of contents page.

12. The method of claim 9, wherein:
one or more of the plurality of main sections, one or more of the plurality of first sub-sections, and/or one or more additional sub-sections of a plurality of additional sub-sections associated with one or more additional table of contents pages are configured as a content link associated with a content page; and
the method further comprises, in response to receipt of a user selection of an individual content link, presenting an individual content page associated with the individual content link.

13. The method of claim 12, further comprising presenting highlighted portions of text within one or more content pages.

14. The method of claim 12, further comprising:
presenting a prompt to a user for requesting a submission of annotation text; and
presenting an indication of the submission of annotation text.

15. The method of claim 9, further comprising:
receiving updates regarding one or more digital looseleafs;
presenting an indication corresponding to the updates regarding one or more digital looseleafs.

16. The method of claim 9, further comprising receiving one or more digital looseleafs from a digital looseleaf delivery service.

17. A computer program product comprising:
a non-transitory, processor-readable storage medium having computer readable instructions embodied therein for displaying one or more digital looseleafs, the computer readable instructions, when executed by a processor, cause the processor to:
display a representation of at least one of the one or more digital looseleafs on a computer display;
display an update summary of one or more digital looseleafs;
in response to receipt of a user selection of the one or more digital looseleafs, display a first table of contents page of the selected digital looseleaf, wherein:
the selected digital looseleaf comprises hierarchically organized content; and
the first table of contents page displays a representation of a plurality of main sections associated with the hierarchically organized content;
receive a user selection of a representation of an individual one of the plurality of main sections;
automatically generate a second table of contents page in response to the user selection and existing content, wherein the existing content has been recently updated in real time from information received from a publisher;
display the second table of contents page overtop the first table of contents page such that an edge portion of the first table of contents page is unobstructed by the second table of contents page, wherein the edge portion contains at least a portion of the representation of the plurality of main sections and the second table of contents page displays a representation of a plurality of first sub-sections associated with the selected representation of the individual one of the plurality of main sections; and
in response to a user input in the edge portion of the first table of contents page, display an entirety of the first table of contents page.

18. The computer program product of claim 17, wherein the computer readable instructions further cause the processor to, in response to receipt of a user selection of a representation of an individual one of the plurality of first sub-sections, display a third table of contents page overtop the second table of contents page such that an edge portion of the second table of contents page is unobstructed by the third table of contents page and the edge portion of the first table of contents page is unobstructed by the second table of contents page, wherein the third table of contents page displays a representation of a plurality of second sub-sections associated with the selected representation of the individual one of the plurality of first sub-sections.

19. The computer program product of claim 18, wherein the computer readable instructions further cause the processor to, in response to receipt of a user input in the edge portion of the second table of contents page, display an entirety of the second table of contents page such that the edge portion of the first table of contents page is unobstructed by the second table of contents page.

20. The computer program product of claim 17, wherein:
one or more of the plurality of main sections, one or more of the plurality of first sub-sections, and/or one or more additional sub-sections of a plurality of additional sub-sections associated with one or more additional table of contents pages are configured as a content link associated with a content page; and
wherein the computer readable instructions further cause the processor to, in response to receipt of a user selection of an individual content link, display an individual content page associated with the individual content link.

* * * * *